United States Patent
Yamagata

(10) Patent No.: US 8,651,718 B2
(45) Date of Patent: Feb. 18, 2014

(54) VEHICLE LIGHT FITTING UNIT

(75) Inventor: Shinji Yamagata, Hadano (JP)

(73) Assignee: Stanley Electric Co., Ltd., Tokyo (JP)

( * ) Notice: Subject to any disclaimer, the term of this patent is extended or adjusted under 35 U.S.C. 154(b) by 139 days.

(21) Appl. No.: 13/427,872

(22) Filed: Mar. 22, 2012

(65) Prior Publication Data
US 2012/0243247 A1  Sep. 27, 2012

(30) Foreign Application Priority Data
Mar. 22, 2011  (JP) ................. 2011-061891

(51) Int. Cl.
*F21S 8/10* (2006.01)
*F21V 21/00* (2006.01)

(52) U.S. Cl.
USPC ........... 362/545; 362/516; 362/520; 362/538; 362/539; 362/544

(58) Field of Classification Search
USPC ................ 362/516, 520, 538, 539, 543–545
See application file for complete search history.

(56) References Cited

U.S. PATENT DOCUMENTS 7,628,517 B2 * 12/2009 Domoto et al. ............... 362/543
8,511,874 B2 * 8/2013 Nakada ......................... 362/544

FOREIGN PATENT DOCUMENTS

JP    2008-135247 A    6/2008

* cited by examiner

*Primary Examiner* — Stephen F Husar
(74) *Attorney, Agent, or Firm* — Kenealy Vaidya LLP

(57) ABSTRACT

A vehicle light fitting unit includes two headlights which irradiate a low beam. The two headlights can each include a light emitting element, an elliptical series reflecting surface provided in a state where a first focal position is positioned near the light emitting element and a second focal position is positioned on an optical axis of the headlight, and a projecting lens provided so that a focal position on a rear side of the light irradiating direction is near the second focal position. Only a first headlight among the two headlights includes a light shielding member. The elliptical series reflecting surface of a second headlight is positioned so that the first focal position is positioned to the front of the light irradiating direction than the light emitting element.

5 Claims, 5 Drawing Sheets

WITH LIGHT SHIELDING MEMBER
ADJUSTMENT AMOUNT FROM
A FIRST FOCAL POSITION
0 mm

WITHOUT LIGHT SHIELDING MEMBER
ADJUSTMENT AMOUNT FROM
A FIRST FOCAL POSITION
0 mm

WITHOUT LIGHT SHIELDING MEMBER
ADJUSTMENT AMOUNT FROM
A FIRST FOCAL POSITION
+0.5 mm

WITHOUT LIGHT SHIELDING MEMBER
ADJUSTMENT AMOUNT FROM
A FIRST FOCAL POSITION
+1mm

WITHOUT LIGHT SHIELDING MEMBER
ADJUSTMENT AMOUNT FROM
A FIRST FOCAL POSITION
+1.5mm

WITHOUT LIGHT SHIELDING MEMBER
ADJUSTMENT AMOUNT FROM
A FIRST FOCAL POSITION
+2mm

VEHICLE LIGHT FITTING UNIT

This application claims the priority benefit under 35 U.S.C. §119 of Japanese Patent Application No. 2011-061891 filed on Mar. 22, 2011, which is hereby incorporated in its entirety by reference.

BACKGROUND

1. Field

The presently disclosed subject matter relates to a vehicle light fitting unit.

2. Description of Related Art

Conventionally, as a vehicle light fitting unit such as an automobile headlight, a vehicle light fitting unit in which two headlights which are provided parallel irradiate a low beam is proposed.

For example, as shown in FIG. 4A, each headlight 100 of the vehicle light fitting unit includes a light emitting element 102, an elliptical series reflecting surface 101, a projecting lens 104, and a light shielding member 103.

Among the above, the light emitting element 102 is formed in a rectangular flat plate shape elongated in the left and right direction, and is mounted on a circuit substrate 102A tilted to the rear.

The elliptical series reflecting surface 101 is formed in a concave shape open to the front of the light irradiating direction and is provided in a state in which a first focal position 101A is positioned near the light emitting element 102 and a second focal position 101B is positioned on the optical axis X of the headlight 100 so that light from the light emitting element 102 reflects to the front of the light irradiating direction.

The projecting lens 104 is provided on the optical axis X so that the focal position on the side of the rear of the light irradiating direction is positioned in the front of the area near the second focal position 101B.

The light shielding member 103 is provided lowered from near the second focal position 101B, shields a portion of the reflected light from the elliptical series reflecting surface 101 to the projecting lens 104 and forms a light distribution pattern including a boundary between light and dark (cut off).

In such headlight, after the image of the light emitting element 102 provided in the first focal position 101A is formed in the second focal position 101B, the image is projected forward by the projecting lens 104. However, the light reflected in the lower half section of the reflecting surface 101, in other words, the light projected forward and upward by the projecting lens 104 is shielded by the light shielding member 103 and does not reach the projecting lens 104. Therefore, the upward light is not included in the irradiating light of the vehicle light fitting unit and a low beam light distribution shape is obtained as shown in FIG. 4B or FIG. 4C. The diagrams are schematic diagrams showing a light distribution pattern formed on a virtual screen separated a predetermined distance to the front of the vehicle when the vehicle light fitting unit is for right hand traffic. The heavy line shows one of the headlights forming the light distribution (diffusion light distribution) in a relatively large area and the two dot chain line shows the other headlight forming the light distribution (concentration light distribution) in a relatively small area. Moreover, in the diagram, line H shows the line intersection between the horizontal plane which passes the optical axis X and the virtual screen and line V shows the line intersection between the vertical plane which passes the optical axis X and the virtual screen.

However, in the conventional vehicle light fitting unit, a clear cut off of the light and dark boundary is formed in the upper edge section of the light distribution and there is a problem that light above the cut off is not irradiated at all. Therefore, pitching of the vehicle occurs or in a situation where up and down of the road surface continues, it is difficult to see forward, danger avoidance action is delayed or the above becomes a reason of fatigue when driving. When forward and upward light is irradiated too much, this provides a blinding light to oncoming vehicles.

SUMMARY

The presently disclosed subject matter includes a vehicle light fitting unit in which forward and upward light being irradiated can be suppressed while being able to blur the light and dark boundary than conventional technique.

According to an aspect of the presently disclosed subject matter, there is provided a vehicle light fitting unit including:
  two headlights which irradiate a low beam,
  the two headlights each including:
    a light emitting element;
    an elliptical series reflecting surface formed with a concave shape open to the front of a light irradiating direction and provided in a state where a first focal position is positioned near the light emitting element and a second focal position is positioned on an optical axis of the headlight to reflect light from the light emitting element to the front of the light irradiating direction; and
    a projecting lens provided on the optical axis so that a focal position on a rear side of the light irradiating direction is positioned near the second focal position;
  wherein:
  only a first headlight among the two headlights includes a light shielding member which is provided lowered from near the second focal position and which shields a portion of a reflected light from the reflecting surface to the projecting lens to form a light distribution pattern including a light and dark boundary; and
  the elliptical series reflecting surface of a second headlight is positioned so that the first focal position is positioned to the front of the light irradiating direction than the light emitting element.

BRIEF DESCRIPTION OF THE DRAWINGS

The above and other characteristics, advantages, and features of the presently disclosed subject matter will become more fully understood from the detailed description given hereinbelow and the appended drawings which are given by way of illustration only, and thus are not intended as a definition of the limits of the presently disclosed subject matter, wherein.

DESCRIPTION OF EXEMPLARY EMBODIMENTS

Figure 1:
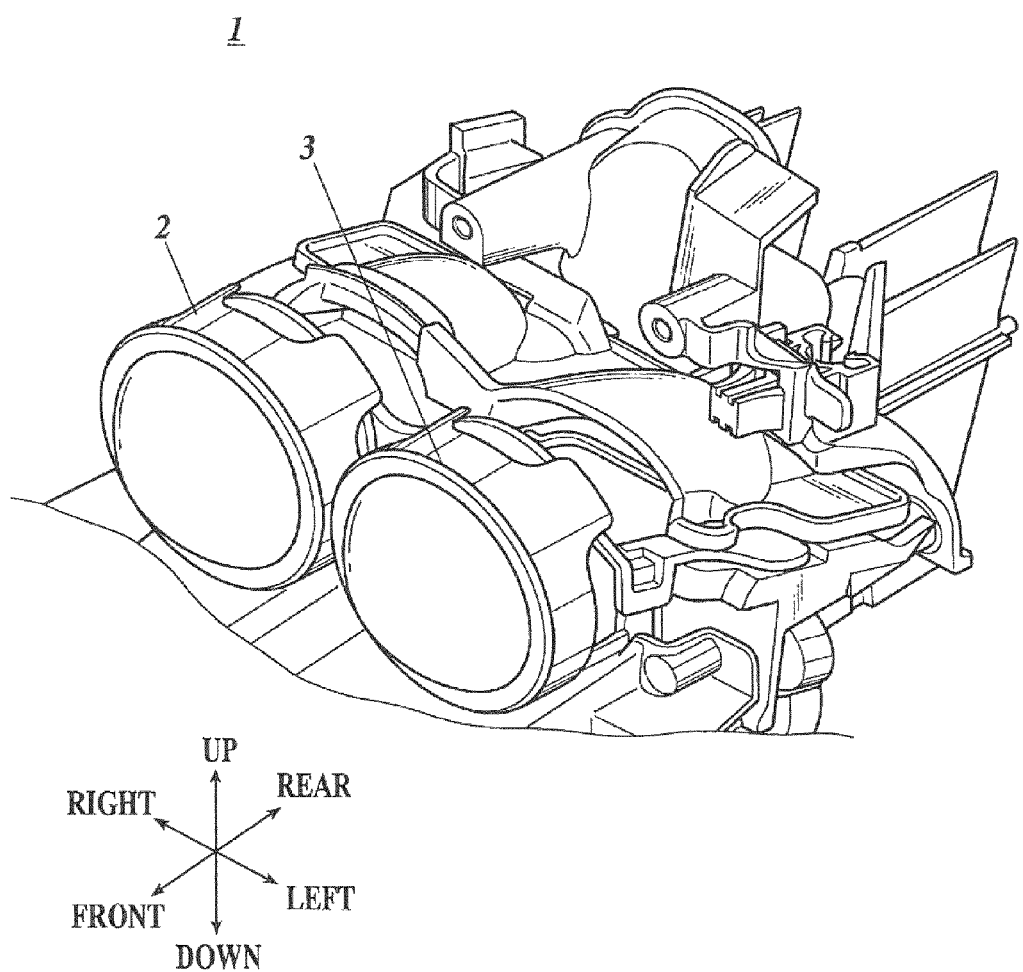
FIG. 1 is a perspective view showing a vehicle light fitting unit employing the presently disclosed subject matter.

Exemplary embodiments of the presently disclosed subject matter are described with reference to the drawings. Although the following embodiments include various technically features to implement the presently disclosed subject matter, the scope of the disclosed subject matter is not limited by the embodiments and the illustrated examples. A same reference numeral is applied to a similarly included portion corresponding to the above described conventional technique and the description is omitted. In the description below, "up", "down", "front", "rear", "left" and "right" are respectively "up", "down", "front", "rear", "left" and "right" of a vehicle mounted with the vehicle light fitting unit. Therefore, the left and right direction is determined facing from the rear to the front (viewpoint of driver).

<Configuration of Vehicle Light Fitting Unit>

FIG. 1 is a perspective view of a vehicle light fitting unit 1 of the present embodiment.

As shown in the above diagram, the vehicle light fitting unit 1 includes two headlights 2, 3 with different irradiating ranges and the headlights 2, 3 function together (each irradiated light is combined) to irradiate a low beam.

Figure 4A:
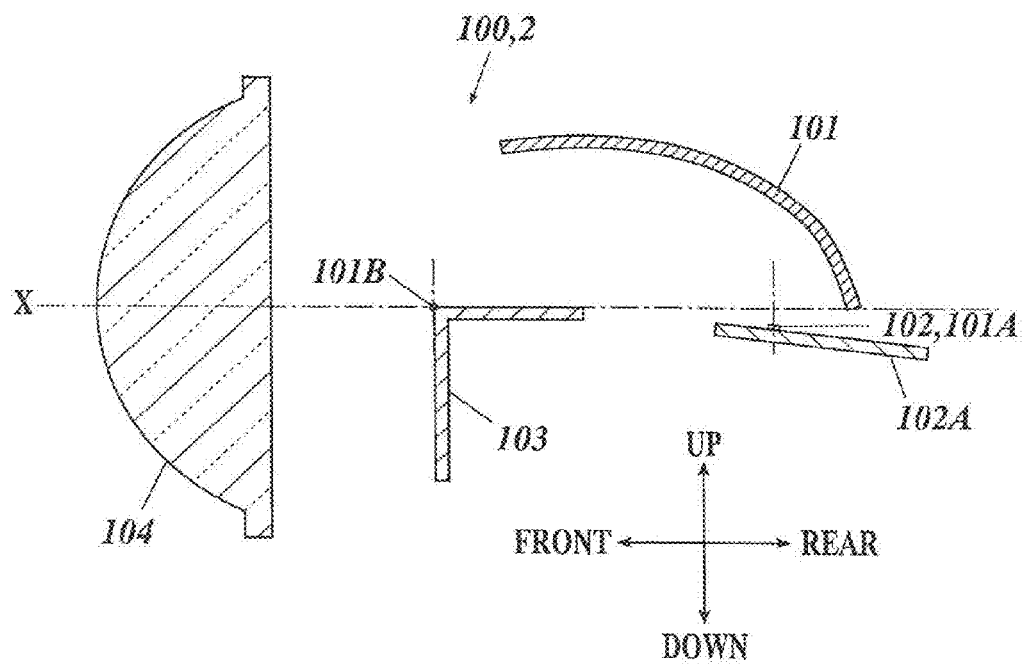
FIG. 4A is a cross sectional view of a conventional headlight.
Figure 4B:
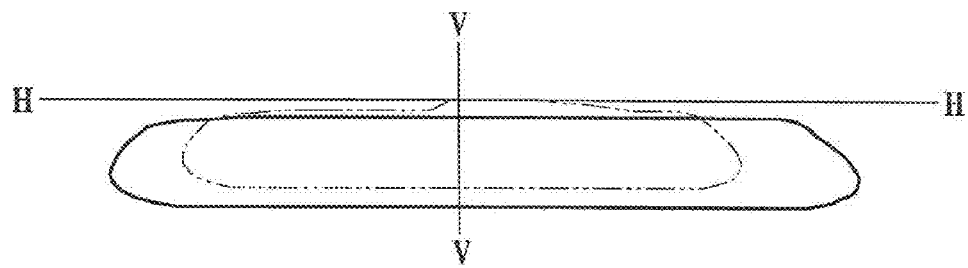
FIG. 4B and FIG. 4C are diagrams showing a light distribution shape of a conventional vehicle light fitting unit.
Figure 4C:
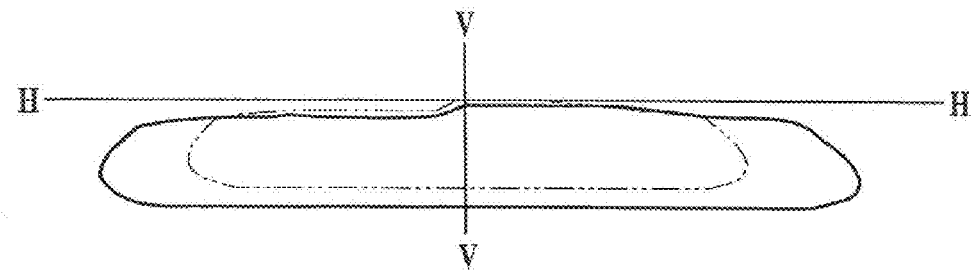

Among the headlights 2, 3, one of the headlights which is headlight 2 has the same configuration as the headlight which irradiates light of concentration light distribution among the two headlights of the conventional vehicle light fitting unit as shown in the above FIG. 4A, and therefore, the description is omitted. In FIG. 1, the headlight 2 is provided to the right side of the headlight 3, however, the headlight 2 can be provided to the left side of the headlight 3.

Figure 2A:
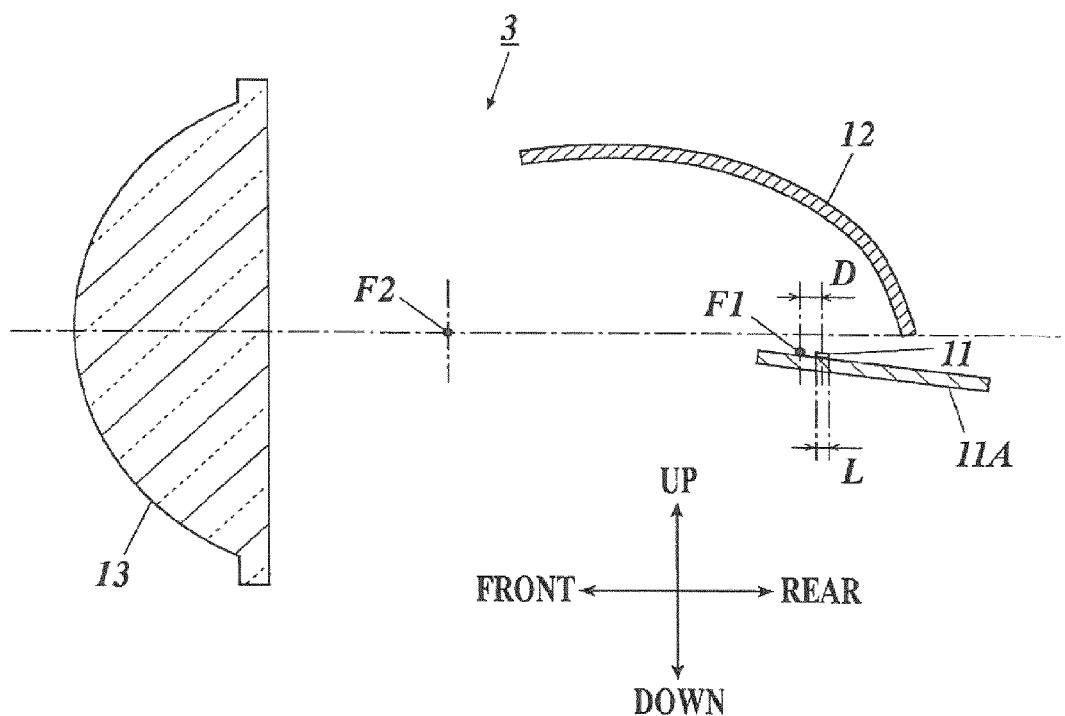
FIG. 2A is a cross sectional view showing a schematic configuration of a headlight not including a light shielding member.

The other of the headlights which is headlight 3 includes a light emitting element 11, a reflecting surface 12 and a projecting lens 13 as shown in FIG. 2A.

The light emitting element 11 is formed in a rectangular flat plate shape elongated in the left and right direction, and is mounted on an upper surface of a circuit substrate 11A tilted to the rear. With this, the light irradiated from the light emitting element 11 is shielded by the circuit substrate 11A and is directed to a direction parallel to the upper surface of the circuit substrate 11A and above the circuit substrate 11A. The dimensions of the light emitting element 11 of the present embodiment are, the length of the light irradiating direction (front and rear direction) is 1 mm and the length in the left and right direction is 5 mm. As such light emitting element 11, a light emitting diode, an inorganic electroluminescence element, an organic electroluminescence element or other semiconductor light emitting element can be used.

Figure 2B:
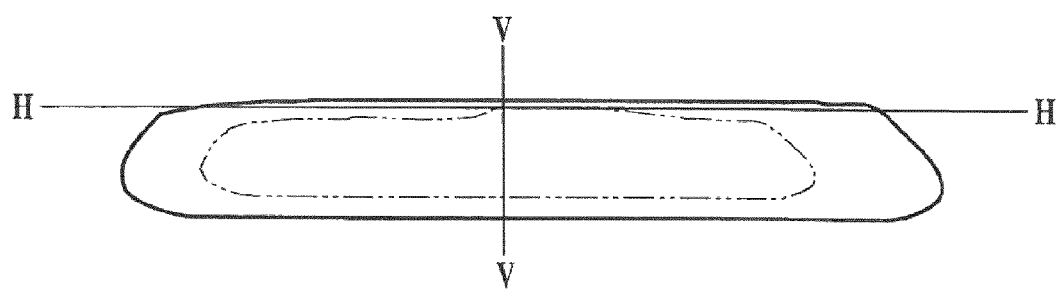
FIG. 2B is a diagram showing a light distribution shape of the vehicle light fitting unit employing the presently disclosed subject matter.

The reflecting surface 12 is an elliptical series reflecting surface formed in a concave shape open to the front to reflect light from the light emitting element 11 forward. The reflecting surface 12 is formed to substantially entirely provide diffusion light distribution in a low beam light distribution pattern, in other words, a light distribution with a region larger than the concentration light distribution of the headlight 2. The reflecting surface 12 is provided in a state in which a first focal position F1 (rear focal position) is positioned near the light emitting element 11 and a second focal position F2 (front focal position) is positioned on an optical axis O of the headlight 3. Described in detail, the first focal position F1 of the reflecting surface 12 is positioned to the front than the light emitting element 11, and when the length of the light emitting element 11 in the light irradiating direction is L (1 mm in the present embodiment), a distance D to the position of the light emitting element 11 in the light irradiating direction satisfies a formula L≤D<2L. Here, as shown in FIG. 2B, the upper edge section of the diffusion light distribution (see heavy line in drawing) formed by the reflecting surface 12 is higher than the upper edge section of the concentration light distribution (see two dot chain line in drawing) formed by the reflecting surface 101 of the headlight 2 including the light shielding member 103 and forms the upper edge section of the low beam formed by the vehicle light fitting unit 1. In the drawing, line H shows the line intersection between the horizontal plane which passes the optical axis O and the virtual screen and line V shows the line intersection between the vertical plane which passes the optical axis O and the virtual screen.

The elliptical series reflecting surface is not limited to a spheroid and an elliptic cylinder and includes any free curved surface based on an elliptical surface. Conventional well known technique can be used as the reflecting surface 12.

The projecting lens 13 is a lens which condenses light moving to the front from the light emitting element 11 or the reflecting surface 12 and irradiates the light to the front. The projecting lens 13 is provided on the optical axis O to the front of the reflecting surface 12 so that the focal position on the side of the light emitting element 11 (rear side) is positioned near the second focal position F2 of the reflecting surface 12. The projecting lens 13 of the present embodiment includes an optical surface in a convex shape to the front and an optical surface flat to the rear (light emitting element 11 side).

<Operation and Effect>

Next, operation and effect of the vehicle light fitting unit 1, specifically, the headlight 3 is described.

The light which exits from the light emitting element 11 directly moves or is reflected by the reflecting surface 12 forward toward the area near the second focal position F2 and enters the optical surface 13B of the projecting lens 13.

Here, since the headlight 3 does not include a light shielding member, different from the headlight 2 including the light shielding member 103, the light entering the optical surface 13B is not shielded, and a clear cut off forming at the upper edge section of the light distribution can be prevented.

Moreover, according to the reflecting surface 12 of the headlight 3, the first focal position F1 is positioned to the front than the light emitting element 11 and this suppresses the light from being irradiated forward and upward with the projecting lens 13.

The light which is transmitted through the projecting lens 13 and condensed by the optical surface 13A is irradiated forward as the diffusion light distribution of the low beam and at least forms the upper edge section of the low beam (see heavy line of FIG. 2B).

Figure 3A:
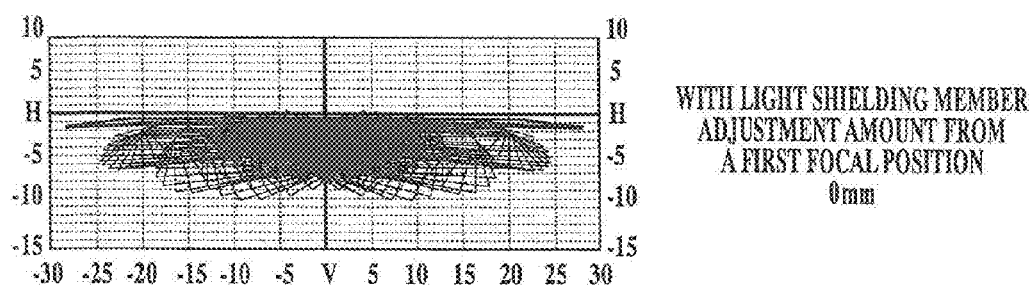
FIG. 3A to FIG. 3F are diagrams showing light distribution shapes of headlights adjusting whether or not to include a light shielding member and adjustment amount of a first focal position of a reflecting surface from a position of a light emitting element.
Figure 3B:
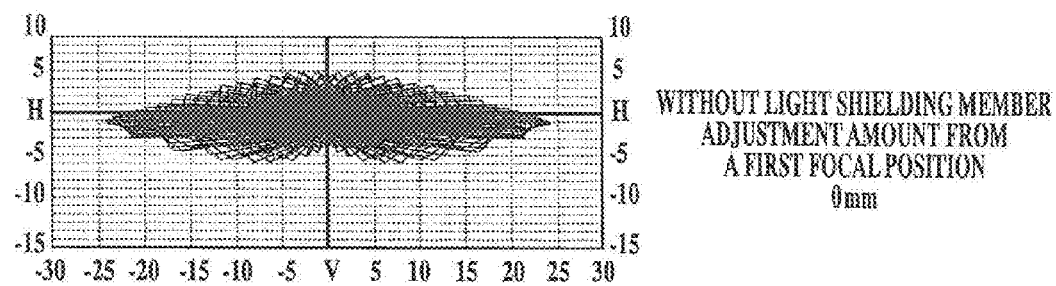
Figure 3C:
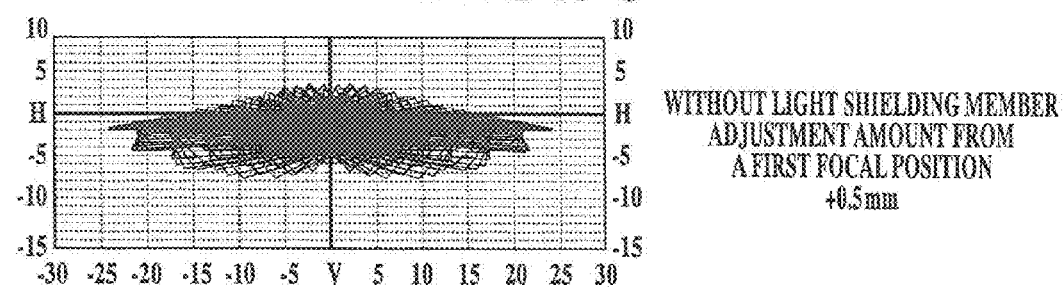
Figure 3D:
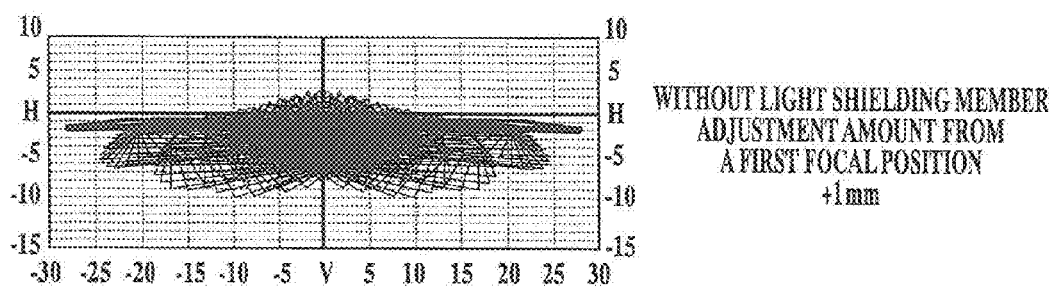
Figure 3E:
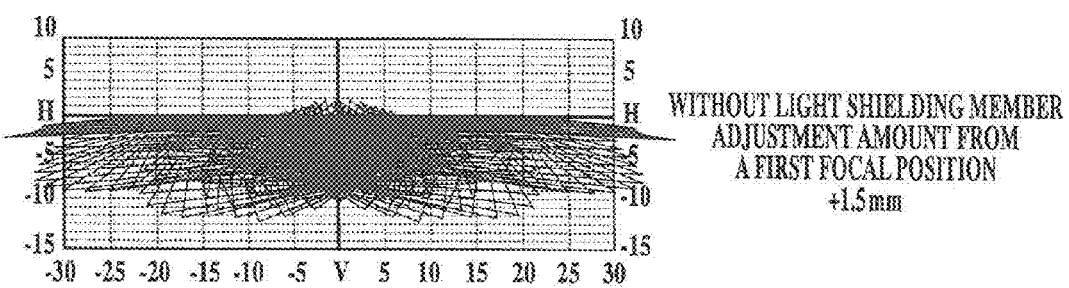
Figure 3F:
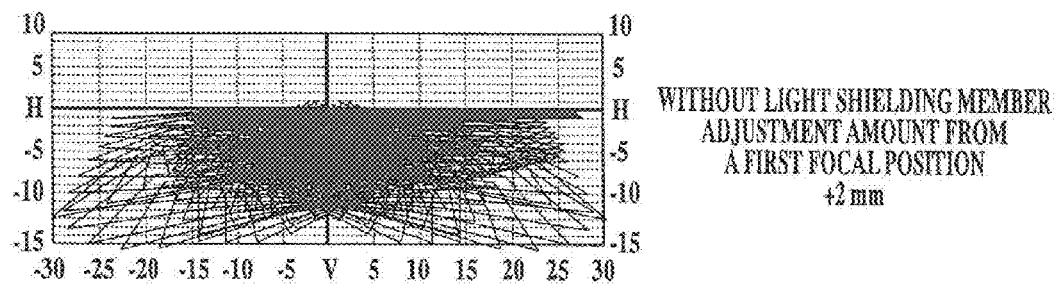

FIG. 3A to FIG. 3F show a change of light distribution shapes of headlight 3 adjusting whether or not to include a light shielding member and adjustment amount of the first focal position F1 of the reflecting surface 12 from a position of the light emitting element 11. Specifically, FIG. 3A is a diagram showing a light distribution shape obtained by the headlight 3 when a light shielding member such as the light shielding member 103 is provided and the position of the light emitting element 11 matches with the first focal position F1. FIG. 3B to FIG. 3F are diagrams showing light distribution shapes obtained by the headlight 3 when a light shielding member such as the light shielding member 103 is not provided and the first focal position F1 is adjusted to the front from the position of the light emitting element 11 (or when the position of the light emitting element 11 matches with the first focal position F1).

It is possible to understand from the drawings that when the light shielding member is provided in the headlight 3, the light and dark boundary of the upper edge section of the light distribution becomes too clear (see FIG. 3A), and when the light shielding member is not provided, the light and dark boundary of the upper edge section is blurred (see FIG. 3B to FIG. 3F). Further, it is possible to understand that as the first focal position F1 is adjusted to the front from the position of the light emitting element 11, the forward and upward irradiating light reduces and when adjusted 1 mm or more, in other words, when adjusted to a length L of the light emitting element 11 in the light irradiating direction or more, the forward and upward irradiating light reduces sufficiently.

As described above, according to the vehicle light fitting unit 1, among the two headlights 2, 3, only headlight 2 includes the light shielding member 103 and the headlight 3 does not include the light shielding member. Therefore, different from the conventional vehicle light fitting unit in which both headlights include the light shielding member, it is possible to prevent forming a clear cut off in the upper edge section of the light distribution. Therefore, it is possible to blur the light and dark boundary than conventional technique.

Moreover, with the reflecting surface 12 in the headlight 3, the first focal position F1 is positioned to the front than the light emitting element 11. Therefore, it is possible to suppress the light from being irradiated forward and upward with the projecting lens 13. Moreover, the length L of the light emitting element 11 in the light irradiating direction and the distance D in the light irradiating direction from the first focal position F1 to the position of the light emitting element 11 satisfies L≤D. Therefore, it is possible to reliably suppress the light from being irradiated forward and upward with the projecting lens 13.

The length L and the distance D satisfy D<2L. Therefore, the light distribution pattern formed on a screen separated a predetermined distance to the front of the vehicle satisfies the United States Federal Motor Vehicle Safety Standards (FMVSS) article 108 which regulates that the maximum luminosity at the measuring point 1 U-1.5 L to L(°) is 700 candela and the maximum luminosity at the measuring point 0.5 U-1.5 L to L(°) is 1000 candela.

The light emitting element 11 of the headlight 3 is provided on the upper surface of the circuit substrate 11A. Therefore, the light which moves toward the region of the lower side of the reflecting surface 12 can be shielded with the circuit substrate 11A. Consequently, since the light reflecting forward and upward from the reflecting surface 12 can be reduced, it is possible to reliably suppress the light irradiating forward and upward with the projecting lens 13.

The irradiating light from the headlight 3 at least forms the upper edge section of the low beam. Consequently, the light and dark boundary of the upper edge section of the light distribution of the entire vehicle light fitting unit 1 can be blurred.

The headlight 3 irradiates a region larger than the headlight 2. Therefore, the shape of the light distribution (concentration light distribution) of the headlight 2 changing can be prevented.

The presently disclosed subject matter should not be construed to be limited to the embodiments described above, and the presently disclosed subject matter can be suitably changed and modified.

According to an aspect of the presently disclosed subject matter there is provided a vehicle light fitting unit that can include:
two headlights which irradiate a low beam,
the two headlights each including:
    a light emitting element;
    an elliptical series reflecting surface formed with a concave shape open to the front of a light irradiating direction and provided in a state where a first focal position is positioned near the light emitting element and a second focal position is positioned on an optical axis of the headlight to reflect light from the light emitting element to the front of the light irradiating direction; and
    a projecting lens provided on the optical axis so that a focal position on a rear side of the light irradiating direction is positioned near the second focal position;
wherein:
only a first headlight among the two headlights includes a light shielding member which is provided lowered from near the second focal position and which shields a portion of a reflected light from the reflecting surface to the projecting lens to form a light distribution pattern including a light and dark boundary; and
the elliptical series reflecting surface of a second headlight is positioned so that the first focal position is positioned to the front of the light irradiating direction than the light emitting element.

Consequently, among the two headlights, only the first headlight includes the light shielding member and the second headlight does not include the light shielding member. Therefore, different from the conventional vehicle light fitting unit in which both headlights include the light shielding member, it is possible to prevent forming a clear cut off in the upper edge section of the light distribution. Therefore, it is possible to blur the light and dark boundary than conventional technique.

Moreover, with the elliptical series reflecting surface in the second headlight which does not include the light shielding member, the first focal position is positioned to the front than the light emitting element in the light irradiating direction. Therefore, it is possible to suppress the light from being irradiated forward and upward with the projecting lens. Therefore, the blinding light provided to oncoming vehicles can be reduced.

In the second headlight, when a length of the light emitting element in the light irradiating direction is L, a distance D in the light irradiating direction between the first focal position and the position of the light emitting element is L≤D<2L.

Consequently, the length L and the distance D satisfy L≤D. Therefore, it is possible to reliably suppress the light from being irradiated forward and upward with the projecting lens.

Moreover, the length L and the distance D satisfy D<2L. Therefore, the light distribution pattern formed on a screen separated a predetermined distance to the front of the vehicle satisfies the United States Federal Motor Vehicle Safety Standards (FMVSS) article 108 which regulates that the maximum luminosity at the measuring point 1 U-1.5 L to L(°) is 700 candela and the maximum luminosity at the measuring point 0.5 U-1.5 L to L(°) is 1000 candela.

The light emitting element of the second headlight can be provided on an upper surface of a substrate.

The light emitting element of the second headlight is provided in the upper surface of the substrate. Therefore, the light which moves toward the region of the lower side of the elliptical series reflecting surface can be shielded with the substrate. Consequently, since the light reflecting forward and upward from the elliptical series reflecting surface can be reduced, it is possible to reliably suppress the light irradiating forward and upward with the projecting lens.

The irradiating light of the second headlight at least forms an upper edge section of the low beam.

The irradiating light from the second headlight at least forms the upper edge section of the low beam. Consequently, the light and dark boundary of the upper edge section of the light distribution of the entire vehicle light fitting unit can be blurred.

The second headlight can irradiate a larger region than the first headlight.

The second headlight irradiates a region larger than the first headlight. Therefore, the shape of the light distribution (concentration light distribution) of the first headlight changing can be prevented.

The entire disclosure of Japanese Patent Application No. 2011-061891 filed on Mar. 22, 2011 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A vehicle light fitting unit comprising:
   two headlights which irradiate a low beam,
   the two headlights each including:
      a light emitting element;
      an elliptical series reflecting surface formed with a concave shape open to the front of a light irradiating direction and provided in a state where a first focal position is positioned near the light emitting element and a second focal position is positioned on an optical axis of each respective one of the headlights to reflect light from the light emitting element to the front of the light irradiating direction; and
      a projecting lens provided on the optical axis so that a focal position on a rear side of the light irradiating direction is positioned near the second focal position;
   wherein:
      only a first headlight among the two headlights includes a light shielding member which is provided lowered from near the second focal position and which shields a portion of a reflected light from the reflecting surface to the projecting lens to form a light distribution pattern including a light and dark boundary; and
      the elliptical series reflecting surface of a second headlight is positioned so that the first focal position is positioned to the front of the light irradiating direction as compared to a position of the light emitting element.

2. The vehicle light fitting unit according to claim 1, wherein in the second headlight, when a length of the light emitting element in the light irradiating direction is L, a distance D in the light irradiating direction between the first focal position and the position of the light emitting element is $L \leq D < 2L$.

3. The vehicle light fitting unit according to claim 1, wherein the light emitting element of the second headlight is provided on an upper surface of a substrate.

4. The vehicle light fitting unit according to claim 1, wherein the irradiating light of the second headlight at least forms an upper edge section of the low beam.

5. The vehicle light fitting unit according to claim 1, wherein the second headlight is configured to irradiate a larger region than a region irradiated by the first headlight.

* * * * *